(No Model.)
R. WITTMANN.
DIMENSION MEASURE.
No. 256,783. Patented Apr. 18, 1882.
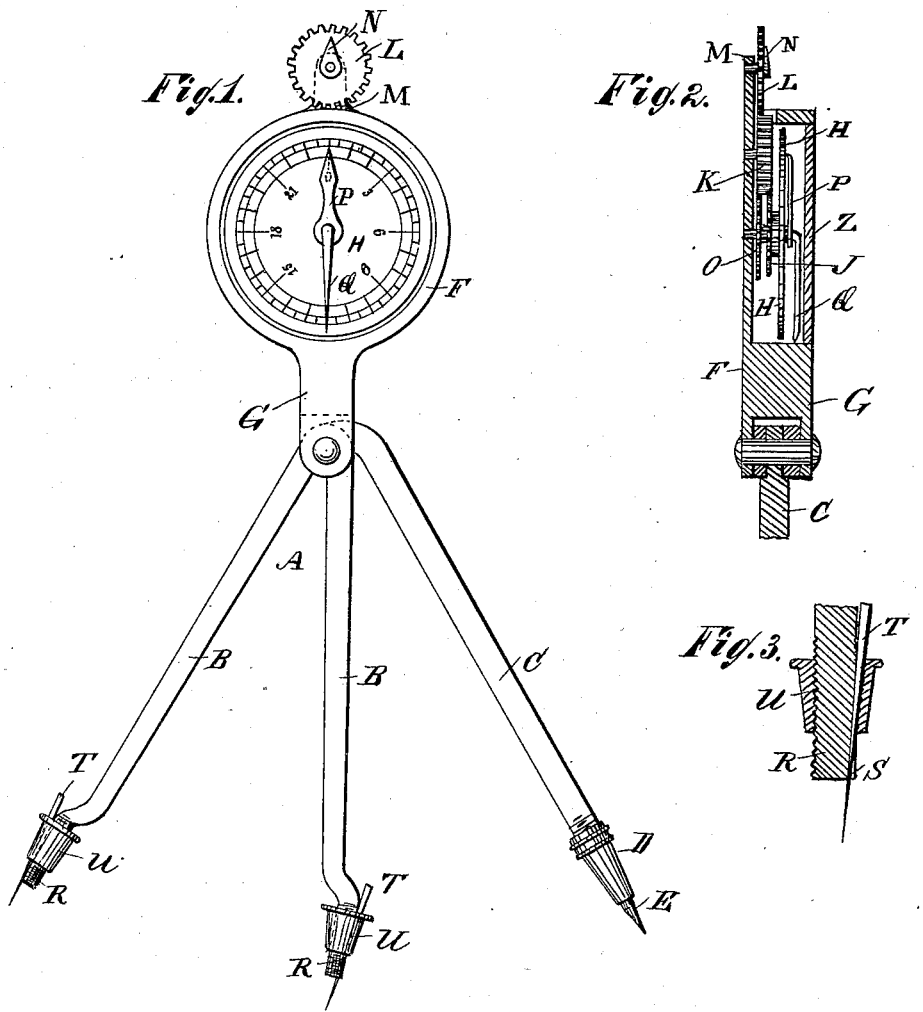
WITNESSES:
Theo. G. Hoster
C. Sedgwick
INVENTOR:
R. Wittmann
BY Munn & Co.
ATTORNEYS.

UNITED STATES PATENT OFFICE.

RUDOLF WITTMANN, OF NEW YORK, N. Y.

DIMENSION-MEASURE.

SPECIFICATION forming part of Letters Patent No. 256,783, dated April 18, 1882.

Application filed July 22, 1881. (No model.)

*To all whom it may concern:*

Be it known that I, RUDOLF WITTMANN, of the city, county, and State of New York, have invented a new and Improved Instrument for Measuring Dimensions, of which the following is a specification.

The object of my invention is to provide a new and improved device for measuring dimensions—such as curved and right lines—rapidly and accurately.

In the accompanying drawings, Figure 1 is a front view of my improved measuring device. Fig. 2 is a cross-sectional elevation of the circular casing of the same. Fig. 3 is a longitudinal sectional elevation of the lower end of the shank of the same. Fig. 4 is a plan view of the under side of the receptacle for my improved measuring device, showing the receptacle opened.

Similar letters of reference indicate corresponding parts.

The dividers A are provided with the ordinary pivoted shanks, B B, and with an additional pivoted shank, C, provided at its lower recessed end with a screw-sleeve, D, for holding a pencil-point, E. A circular casing, F, is attached to the joint-piece G of the dividers, and this casing F contains a dial, H, the diameter of which is equal to one inch and the circumference of which is subdivided into twelve, twenty-four, forty-eight, or any other number of parts. The diameter of this dial can be greater or less than one inch; but I have taken a diameter of one inch as an example. This dial H is attached to a cog-wheel, J, which wheel engages with a cog-wheel, K, of the same size and number of teeth, which in turn engages with a cog-wheel, L, of the same size and number of teeth, and pivoted to a projection, M, of the casing F. One revolution of the wheel L will thus correspond to one revolution of the wheels J and K and the dial H. The projection M is provided with a rigid pointer, N, extending almost to the periphery of the cog-wheel L. A cog-wheel, O, having one tooth more or less than the wheel J, also engages with the cog-wheel K, and is provided with a pointer, P, passed through the center of the dial H and revolving over the face of the same. The casing F is also provided with a rigid pointer, Q, extending from the middle of the dial to the edge of the same; or this pointer can project from the side of the casing a short distance over the dial. The lower ends, R, of the shanks B B are screw-threaded, and are provided with a longitudinal groove, S, increasing in depth toward the end of the shank to receive the needle T. A screw-sleeve, U, fits on these threaded ends R of the shanks.

The instrument fits into a receptacle, V, provided with a recess for the instrument, and with a pivoted cover, W, provided on the under side with an inch-scale, X, and a centimeter-scale, Y. The casing F is provided with a glass cover, Z.

The operation is as follows: The shanks B B are used to measure short lines, &c., in the ordinary manner, and the shank C is used to draw circles. To measure a curved or right line the instrument is inverted so that the wheel L rests on the line to be measured, and then this wheel is trundled along the line to be measured, the position of the dial in regard to the pointers P and Q having been noted. As the wheel O has one tooth more than the wheel J, this wheel O will move so much slower than the wheel J that after one revolution of the wheel L the pointer P will be the distance of one subdivision of the dial back of that point of the dial to which the pointer P pointed at the beginning of the operation. For instance, if the wheels L, J, and K have twenty-three teeth and the pointer P stood at O at the beginning of the operation and the wheel L has made one revolution, the pointer P will point to 23 after the completion of this revolution, and thus the pointer P will always show the number of revolutions made by the wheel L—that is, in this case the length of the measured line in inches—the fractions of inches being shown by the pointer Q. As the grooves S in the lower ends of the shanks B are inclined to the length of these shanks, the needle T will be firmly wedged in between the bottom of the grooves and the screw-sleeves U, and can be fastened or loosened very easily. The pointer P has been described as revolving from right to left, but can be revolved from left to right if the wheel O has one tooth less than the wheel J, instead of one more.

Having thus fully described my invention, I claim as new and desire to secure by Letters Patent—

1. A measuring-instrument having on the piece G a casing, F, provided with the dial H, the pointer Q, and the cog-wheel J, the cog-wheel K, the cog-wheel L, journaled in a pointer carrying outside projection, M, and an inside wheel, O, having one cog less than wheel J, and carrying a pointer, P, as shown and described.

2. In a measuring-instrument, the shanks B, screw-threaded at the lower ends and provided with the tapering longitudinal groove S, in combination with the needle T and screw-sleeve U, as and for the purpose specified.

RUDOLF WITTMANN.

Witnesses:
 OSCAR F. GUNZ,
 C. SEDGWICK.